(12) United States Patent
Chen et al.

(10) Patent No.: US 11,503,778 B2
(45) Date of Patent: Nov. 22, 2022

(54) BLOWING-SUCTION MACHINE

(71) Applicant: Ningbo Ruilin Machinery Technology Co., Ltd., Zhejiang (CN)

(72) Inventors: Shuangqing Chen, Zhejiang (CN); Limeng Lu, Zhejiang (CN); Yanan Yang, Zhejiang (CN); Yunbo Yang, Zhejiang (CN); Jiming Tao, Zhejiang (CN)

(73) Assignee: Ningbo Ruilin Machinery Technology Co., Ltd., Ningbo (CN)

( * ) Notice: Subject to any disclaimer, the term of this patent is extended or adjusted under 35 U.S.C. 154(b) by 305 days.

(21) Appl. No.: 16/872,365

(22) Filed: May 11, 2020

(65) Prior Publication Data

US 2021/0282339 A1    Sep. 16, 2021

(30) Foreign Application Priority Data

Mar. 14, 2020  (CN) .......................... 202010178372.9
Mar. 14, 2020  (CN) .......................... 202010178382.2
Mar. 14, 2020  (CN) .......................... 202020320554.0

(51) Int. Cl.
*A01G 20/47*    (2018.01)
*A47L 5/14*    (2006.01)

(52) U.S. Cl.
CPC ............... *A01G 20/47* (2018.02); *A47L 5/14* (2013.01)

(58) Field of Classification Search
CPC .......... A01G 20/47; A47L 5/14; E01H 1/0863
See application file for complete search history.

(56) References Cited

U.S. PATENT DOCUMENTS 5,245,726 A * 9/1993 Rote .................... A47L 5/14
                                        415/121.1
5,586,359 A * 12/1996 Iida .................... A47L 5/14
                                         15/330

(Continued)

FOREIGN PATENT DOCUMENTS

CN    103541326 A    1/2014
CN    106049330 A  * 10/2016

(Continued)

OTHER PUBLICATIONS

The extended European Search Report of European Patent Application No. 20167089.0 dated Sep. 11, 2020.

*Primary Examiner* — Marc Carlson

(57) ABSTRACT

A blowing-suction machine includes a casing, a suction duct arranged at the front portion of the casing. It further includes a motor and a shredder mechanism that are arranged in the casing in order from rear to front. The front end of the shredder mechanism is connected to the rear end of the suction duct. The shredder mechanism includes blades and a cutting assembly that are arranged in order from rear to front. The blades are arranged on an output shaft of the motor. The cutting assembly is arranged at a rear end of the suction duct for shredding fallen leaves. The cutter cooperates with the secondary cutter such that fallen leaves and rigid trashes can be effectively shredded by the blowing-suction machine. Fallen leaves can be effectively separated from air via the collecting cartridge and the filtering unit, such that the amount of the collected leaves is effectively increased.

9 Claims, 8 Drawing Sheets

(56) References Cited

U.S. PATENT DOCUMENTS

| | | | |
|---|---|---|---|
| 5,722,110 A * | 3/1998 | McIntyre | A47L 9/009 15/327.5 |
| 2002/0108211 A1* | 8/2002 | Svoboda | E01H 1/0836 416/235 |
| 2007/0101534 A1 | 5/2007 | Maier et al. | |
| 2008/0110026 A1* | 5/2008 | Marcoe | A01D 34/84 30/124 |
| 2012/0138717 A1* | 6/2012 | Svoboda | A01G 20/47 241/56 |
| 2018/0146628 A1* | 5/2018 | Huo | A47L 9/2857 |
| 2018/0251293 A1 | 9/2018 | Glisson | |
| 2020/0077857 A1* | 3/2020 | Rosenthal | A01G 20/47 |

FOREIGN PATENT DOCUMENTS

| | | | | |
|---|---|---|---|---|
| CN | 110644402 B * | 1/2022 | | E01H 1/0836 |
| DE | 3005701 A1 | 8/1981 | | |
| EP | 792578 A2 * | 9/1997 | | A01G 20/43 |
| EP | 3114976 A1 * | 1/2017 | | A47L 5/14 |
| EP | 3225740 A1 | 10/2017 | | |
| EP | 3725948 A1 * | 10/2020 | | A01G 20/47 |
| WO | WO-2012047228 A1 * | 4/2012 | | A01G 20/47 |

* cited by examiner

A

B

BLOWING-SUCTION MACHINE

CROSS-REFERENCE TO RELATED APPLICATION

This application claims the priority benefit of Chinese Patent Application Nos. 202010178382.2, 202010178372.9 and 202020320554.0, filed on Mar. 14, 2020. The entirety of each of the above-mentioned patent applications is hereby incorporated by reference herein and made a part of this specification.

BACKGROUND

Technical Field

The present application relates to the technical field of garden tool, in particular to a blowing-suction machine.

Description of Related Art

A blowing-suction machine includes a casing, a motor arranged in the casing, blades driven by the motor, a suction duct and an exhaust duct. Fallen leaves can be collected into the collecting bag of the blowing-suction machine through the suction duct. In a conventional blowing-suction machine, the blades are arranged in the casing and are driven by the motor to carry out blowing-out and blowing-in operation, and shredding operation. The disadvantages of the prior art are as follows. Rigid/sharp objects are not allowed to be absorbed since the rigid/sharp objects will damage the collecting bag or the blades.

SUMMARY

The objective of the present application is to provide a blowing-suction machine that has the effect of shredding fallen leaves.

The above objective of the present application is implemented through the technical solutions as follows.

A blowing-suction machine includes a casing, a suction duct arranged at a front portion of the casing. The blowing-suction machine further includes a motor and a shredder mechanism that are arranged in the casing in order from rear to front. A front end of the shredder mechanism is connected to a rear end of the suction duct. The shredder mechanism includes blades and a cutting assembly that are arranged in order from rear to front. The blades are arranged on an output shaft of the motor. The cutting assembly is arranged at a rear end of the suction duct for shredding fallen leaves.

Further, the blowing-suction machine further includes a collecting cartridge connected to a lower portion of the casing, and the collecting cartridge accommodates a filtering unit that is arranged at a rear end of the collecting cartridge for separating fallen leaves from air.

Further, the cutting assembly includes a secondary cutter and a cutter that are adjacently arranged in order from rear to front. The cutter is removably fixed at a front end of the output shaft. The secondary cutter is arranged between the blades and the cutter. The cutter is arranged at the front end of the casing and forms a cutting area with the secondary cutter.

Further, the shredder mechanism further includes a mounting cartridge. The blades and the cutting assembly are accommodated in the mounting cartridge and are arranged in order from rear to front. A front end of the mounting cartridge is connected to the rear end of the suction duct. The motor is connected to the rear end of the mounting cartridge. A mounting opening is arranged at the front end of the mounting cartridge and is communicate with the suction duct. The cutter is arranged at the front end of the mounting cartridge.

Further, the secondary cutter further includes an annular plate, a locating ring, and cutting arms that are arranged between the annular plate and the locating ring in a diameter direction. The locating ring is removably fixed on the mounting cartridge in the peripheral direction. One end of each cutting arm is arranged on the locating ring, and the other end of each cutting arm is arranged on the annular plate.

Further, the mounting cartridge includes a first cartridge connected to the suction duct and a second cartridge for fixing the motor, the mounting opening is arranged in the first cartridge. The locating ring is located in the mounting opening in the peripheral direction. The rear end of the suction duct abuts against the locating ring. The suction duct is fixed to the first cartridge via connectors.

Further, the casing includes a first housing and a second housing that are fixed to each other via bolts. Connecting posts are respectively arranged on outer walls on both sides of the second cartridge. Connecting holes are arranged on the first housing and the second housing for connecting the connecting posts.

Further, a collecting duct is arranged on the collecting cartridge for guiding air toward the filtering unit. The collecting duct is communicated at its upper end with a connecting duct arranged at a lower portion of the mounting cartridge. The collecting cartridge is cylindrical.

Further, the filtering unit includes: an air inlet duct that has an open end and a closed end, and is provided at its sidewall with filtering holes; a locating duct that is integrally formed with the air inlet duct at the open end of the air inlet duct, and an air outlet screen that is provided with air outlet holes and is accommodated in the locating duct.

Further, an annular groove is arranged at the rear end of the collecting cartridge, and the collecting duct is plugged in the annular groove.

According to the above technical schemes, when the motor operates, the blades are rotated to generate negative pressure, such that fallen leaves on the ground are absorbed into the casing. Further, when the motor operates, the blades are rotated to generate negative pressure, such that fallen leaves on the ground are absorbed into the casing. The blades are driven to rotate, and the cutting area is formed by the shredder mechanism. When the fallen leaves enter into the cutting area, the cutter of the cutting assembly cooperates with the secondary cutter of the cutting assembly to shred the collected fallen leaves. The shredded fallen leaves are absorbed again by the blades and are discharged out from the casing after centrifugal motion in the casing. Finally, the fallen leaves are collected and stored.

According to the above technical schemes, after the shredded leaves moves centrifugally in the casing, the mix of air and leaves enters into the collecting cartridge to form a cyclone flow, such that the leaves are held in the collecting cartridge by the centrifugal force. Air is discharged to the surrounding environment after passing through the filtering unit, while the shredded leaves are left in the collecting cartridge.

According to the above technical schemes, the cutter is driven by the motor to rotate. The secondary cutter is stationary. The cutter cooperates with the cutting arms of the secondary cutter to form a cutting area, such that the leaves that are absorbed in the air inlet duct and pass through the cutting area are shredded.

According to the above technical schemes, the mounting cartridge is integrated with the motor, the blades and the cutter arranged on the output shaft, such that a plurality of components are mounted in the casing at a time. The leaves collected by the blades are gathered in the mounting cartridge to move centrifugally so as to avoid falling on other components in the casing, and then are discharged out from the other sides of the mounting cartridge.

According to the above technical schemes, a plurality of the cutting arms are fixed between the annular plate and the locating ring of the secondary cutter, such that the cutting arms are stationary relative to the cutter. When the cutter cuts the leaves into pieces, the cutting arms cooperates with the cutter to improve the cutting efficiency and effect.

According to the above technical schemes, the locating ring is embedded in the mounting opening of the first cartridge and is fixed in the peripheral direction to avoid the secondary cutter from rotating relative the mounting cartridge. When the air inlet duct and the first cartridge are fixed via connectors, the secondary cutter is pressed against in the mounting opening by the air inlet duct, such that the secondary cutter is fixed without using other fixing means. Therefore, the structure is simplified since the number of components to assemble the blowing-suction machine is reduced.

According to the above technical schemes, when the first housing and the second housing are fitted to each other, the connecting posts arranged at the outer side of the second cartridge of the mounting cartridge can be respectively plugged in the first housing and the second housing, to fixedly mounting the mounting cartridge in the casing. Therefore, the mounting cartridge can be mounted without using additional fixing means, so as to optimize the mounting process. The mounting cartridge can be disassembled from the casing at one time without damaging the motor and the like.

According to the above technical schemes, the shredded leaves fall in the mounting cartridge, are forced to move centrifugally by the blades, and pass through the connecting duct. Some of the leaves enter into the collecting cartridge after passing through the collecting duct. Since the collecting cartridge is configured to be cylindrical, the fallen leaves possessing kinetic energy can move centrifugally in the collecting cartridge, such that the leaves can be held in the collecting cartridge. At the same time, air can be discharged out from the collecting cartridge through the filtering unit.

According to the above technical schemes, the air inlet duct of the filtering unit has an open end and a closed end. In addition, filtering holes are distributed over the sidewall of the air inlet duct. When air carrying the leaves flows into the collecting cartridge through the collecting duct, the leaves are retained in the collecting cartridge and move centrifugally since air passes through the filtering holes and prevents fallen leaves from entering into the collecting cartridge. On one hand, the locating duct to be located in the collecting cartridge is arranged at the rear end of the air inlet duct. After being plugged, the locating duct is fixed by the air outlet screen. The air outlet screen is arranged to have air outlet holes. Some of the fallen leaves passing through the filtering holes can be retained by the air outlet screen, thereby performing secondary filtering. On the other hand, the collecting cartridge and the air inlet duct is configured to be cylindrical, such that air coming in through the collecting duct can surround the outer side of the air inlet duct to form a cyclone flow, ensuring that fallen leaves can move centrifugally in the collecting cartridge and reducing the amount of leaves coming in the air inlet duct.

According to the above technical schemes, the locating duct is mounted via the annular groove arranged at the rear end of the collecting cartridge. The locating duct is further located in the collecting cartridge via the air outlet screen. When the locating duct is removed, only air outlet screen needs to be open such that the locating duct can be conveniently removed from the collecting cartridge.

In summary, the beneficial effects of the present invention are as follows. The cutter cooperates with the secondary cutter such that fallen leaves and rigid trashes can be effectively shredded by the blowing-suction machine. Further, fallen leaves can be effectively separated from air via the collecting cartridge and the filtering unit, such that the amount of the collected leaves is effectively increased.

DESCRIPTION OF THE EMBODIMENTS

The present application is further illustrated in detail in combination with the accompanying drawings hereinafter.

Figure 1:
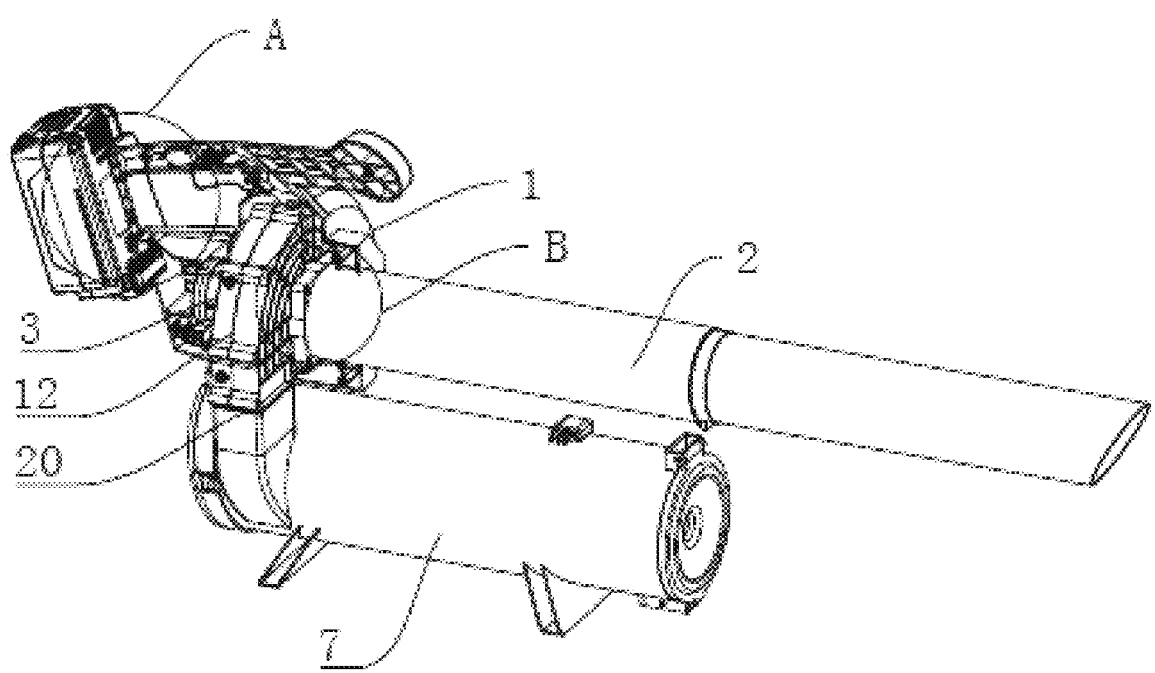
FIG. 1 is a schematic structural view of a blowing-suction machine with a first housing being omitted.

As shown in FIG. 1, a blowing-suction machine includes a casing 1, a suction duct 2 arranged at the front portion of the casing 1, a collecting cartridge 7 arranged at the lower portion of the casing 1, and a motor 3 and a shredder mechanism that are arranged in the casing 1. The shredder mechanism includes a mounting cartridge 12, blades 4 and a cutting assembly 6. A front portion of the mounting cartridge 12 of the shredder mechanism is connected to the suction duct 2, and a connecting duct 20 is arranged at the lower portion of the mounting cartridge 12 for communicated with the collecting cartridge 7. A motor 3 drives blades 4 to rotate, such that fallen leaves absorbed through the suction duct 2 are transported into the collecting cartridge 7. During the transportation, the fallen leaves are shredded into pieces by the cutting assembly 6 of the shredder mechanism.

Figure 2:
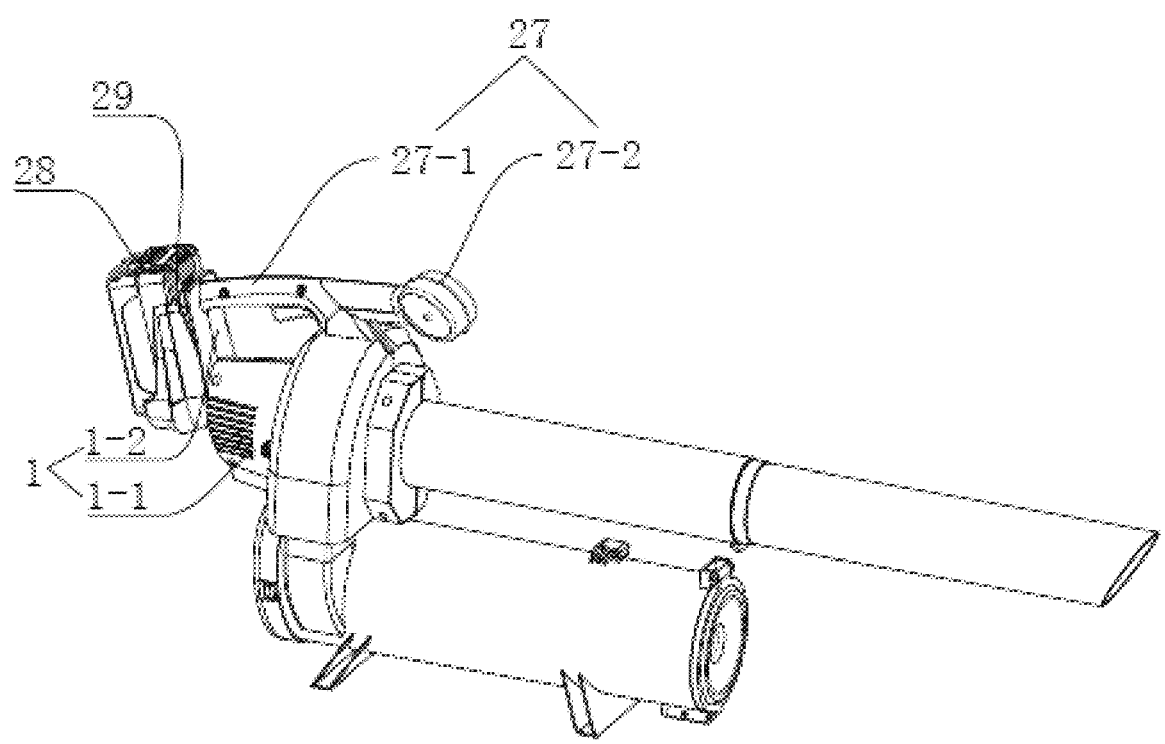
FIG. 2 is a schematic view of a blowing-suction machine.
Figure 3:
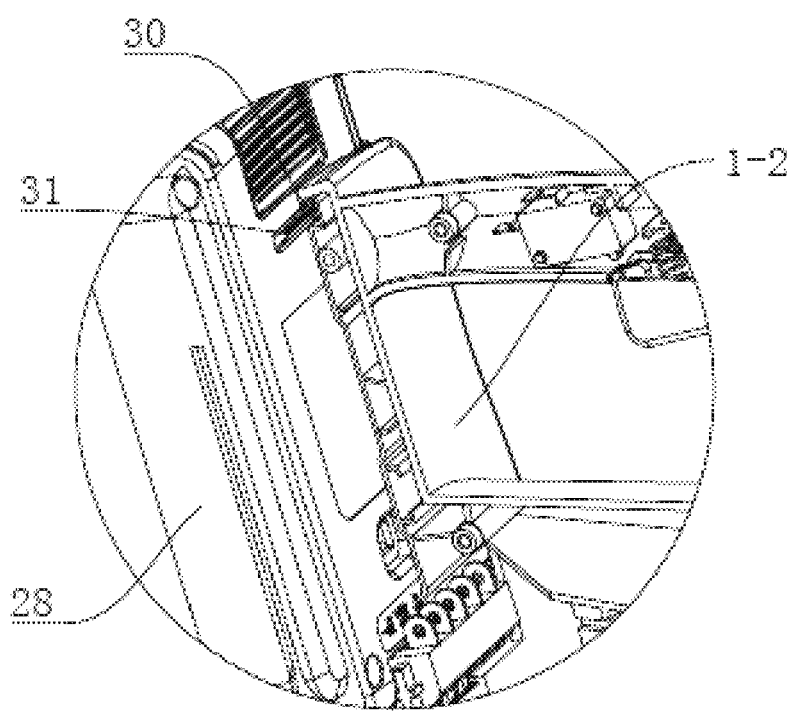
FIG. 3 is an enlarged schematic view of portion "A" illustrated in FIG. 1.

Referring to FIG. 2 and FIG. 3, the casing 1 comprises a first housing 1-1 and a second housing 1-2 that are symmetrically arranged and are fitted to each other with fixing means such as bolts. The tops of the first housing 1-1 and the second housing 1-2 are provided with a gripping part 27. The gripping part 27 includes a first gripping part 27-1 on which a switch is arranged and a second gripping part 27-2 that is arranged at a front end of the gripping part to be gripped by a user. The second gripping part 27-2 is columnar member. A user can change the working direction via the second gripping part 27-2. In addition, a battery case 29 for accommodating a lithium battery is arranged at the rear ends of the first housing 1-1 and the second housing 1-2. The lithium battery 28 is used to supply power to the motor 3. The first housing 1-1 and the second housing 1-2 are fitted with each other, such that the battery case 29 is formed at their rear ends. A fixing groove 30 is formed in the first housing 1-1 and the second housing 1-2. The fixing groove 30 is engaged with a striped projection 31 on the battery case 29 to fix the battery case 29 without using fixing means such as bolts or the like. Therefore, the battery case 29 is integrated into the casing 1.

Figure 4:
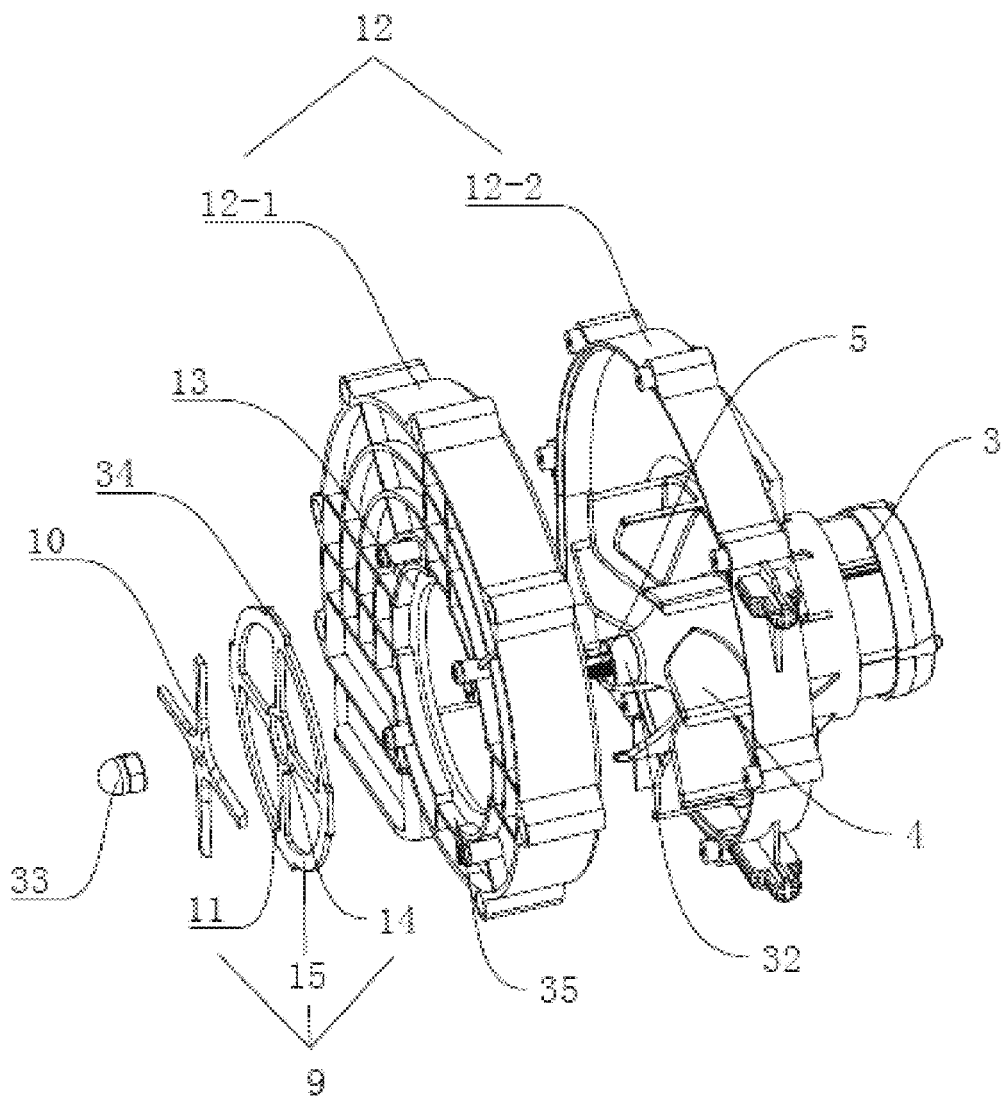
FIG. 4 is an exploded schematic view of a shredder mechanism.

Referring to FIG. 4, the mounting cartridge 12 of the shredder mechanism includes a first cartridge 12-1 and a second cartridge 12-2. The motor 3 is fixed at the rear end of the second cartridge 12-2 via bolts. An output shaft 5 of the motor 3 extends out of the first cartridge 12-1. After the first cartridge 12-1 and the second cartridge 12-2 butt against each other, they are fixed to each other via bolts. The blades 4 are fixed on the output shaft 5 in the mounting cartridge 12. The front end of the output shaft 5 has a waist-round shaped section for conveniently mounting the blades 4. In addition, the cutting assembly 6 includes a cutter 10 and a secondary cutter 9. The cutter 10 is arranged on the output shaft 5. The cutter 10 is a hard alloy member having cutting edges. The blades 4 and the cutter 10 are assembled as below. The blades 4 are sleeved on the output shaft 5. Then a sleeve 32 is arranged on the output shaft 5. The cutter 10 is subsequently sleeved on the output shaft 5. Finally, a nut 33 is engaged with a thread portion at the end of the output shaft 5, such that the cutter 10 is pressed against the sleeve 32 and the blades 4 is pressed against the output shaft 5, thereby completing the assembling of the blades 4 and the cutter 10.

Figure 5:
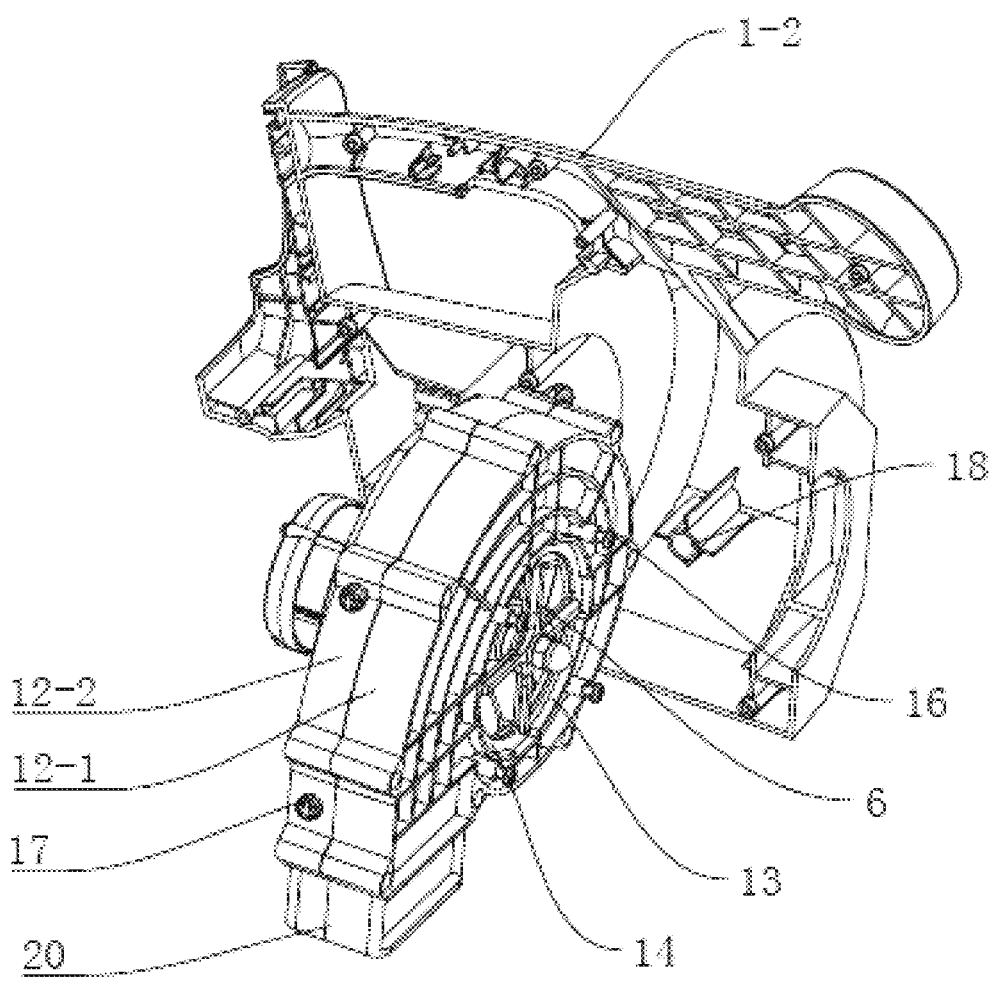
FIG. 5 is a schematic structural view of a mounting cartridge and a second housing.

Referring to FIG. 4 and FIG. 5, a mounting opening 13 is arranged in the first cartridge 12-1. The secondary cutter 9 is received in the mounting opening 13. The cutter 10 is also received in the mounting opening 13. The secondary cutter 9 includes an annular plate 14, cutting arms 11 that are arranged on an inner peripheral edge of the annular plate 14 and extend radially, and a locating ring 15 that is integrally formed with the cutting arms 11 at their ends. The secondary cutter 9 is mounted before the cutter 10 is mounted. The sleeve 32 is arranged to rotate relative to the annular plate 14 of the secondary cutter 9. Specifically, the locating ring 15 is provided with four locating projections 34 at its outer peripheral edge. Locating recesses 35 corresponding to the projections 34 are arranged in a peripheral inner surface of the mounting opening 13. The secondary cutter 9 after received in the mounting opening 13 is peripherally fixed in the mounting opening 13 via the locating projections 34. The cutting arms 11 cooperate with the cutter 10 to form a cutting area for cutting the fallen leaves into pieces when the fallen leaves pass through the cutting area.

Figure 6:
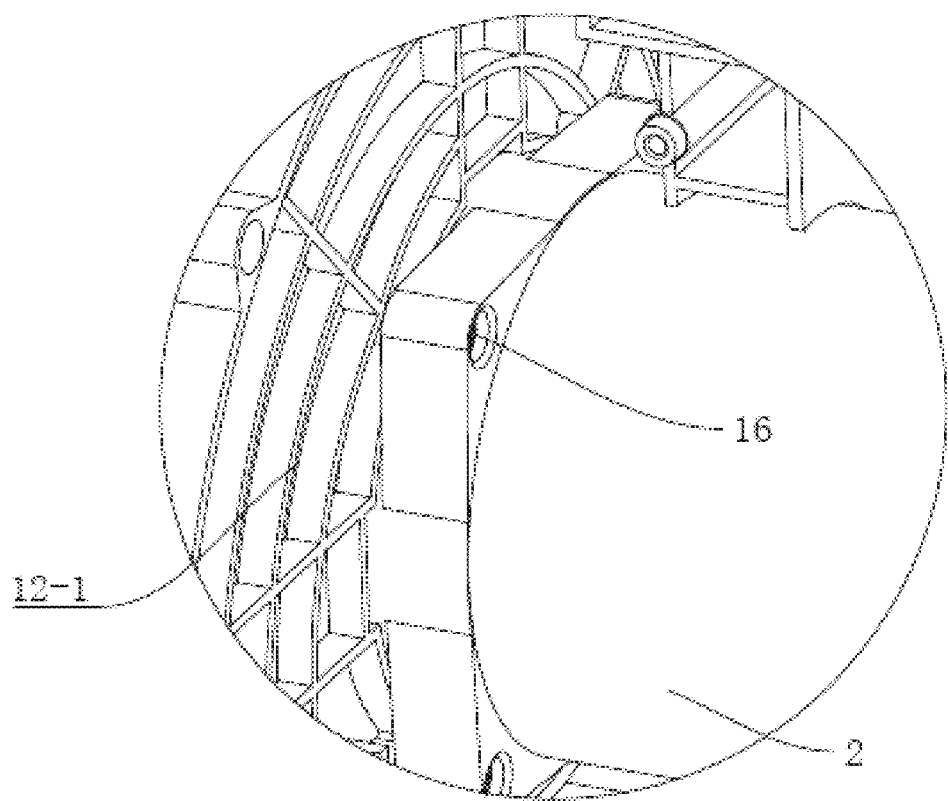
FIG. 6 is an enlarged schematic view of portion "B" illustrated in FIG. 1.

Referring to FIG. 5 and FIG. 6, the suction duct 2 is plugged in and communicated with the casing 1 and is fixed in the mounting opening 13 of the first cartridge 12-1. The front end of the suction duct 2 extends into the mounting opening 13, and is fixedly connected to the first cartridge 12-1 via connectors 16 arranged on the outer side of the first cartridge 12-1. The connectors 16 are preferably bolts. After the suction duct 2 is fixed relative to the first cartridge 12-1, the end of the suction duct 2 presses against the location ring 15 of the secondary cutter 9, such that the locating ring 15 is located in the mounting opening 13 in the axial direction. This configuration reduces the number of required members and the number of mounting steps for further fixing the secondary cutter 9, thereby obtaining a simple structure of the secondary cutter 9.

Referring to FIG. 5, two connecting posts 17 are respectively arranged on outer walls on both sides of the second cartridge 12-2. Two connecting holes 18 are arranged on the first housing 1-1 and the second housing 1-2 at the locations corresponding to those of the connecting posts 17. When the mounting cartridge 12 is mounted, only the connecting posts 17 on the second cartridge 12-2 need to be inserted into the corresponding the connecting holes 18 without requiring additional bolts to fix the casing 1. Therefore, after the first housing 1-1 and the second housing 1-2 are fixed, the shredder mechanism is directly fixed in the casing 1. Since the shredder mechanism is modularized, the process of assembling or disassembling the blowing-suction machine is considerably simplified.

Figure 7:
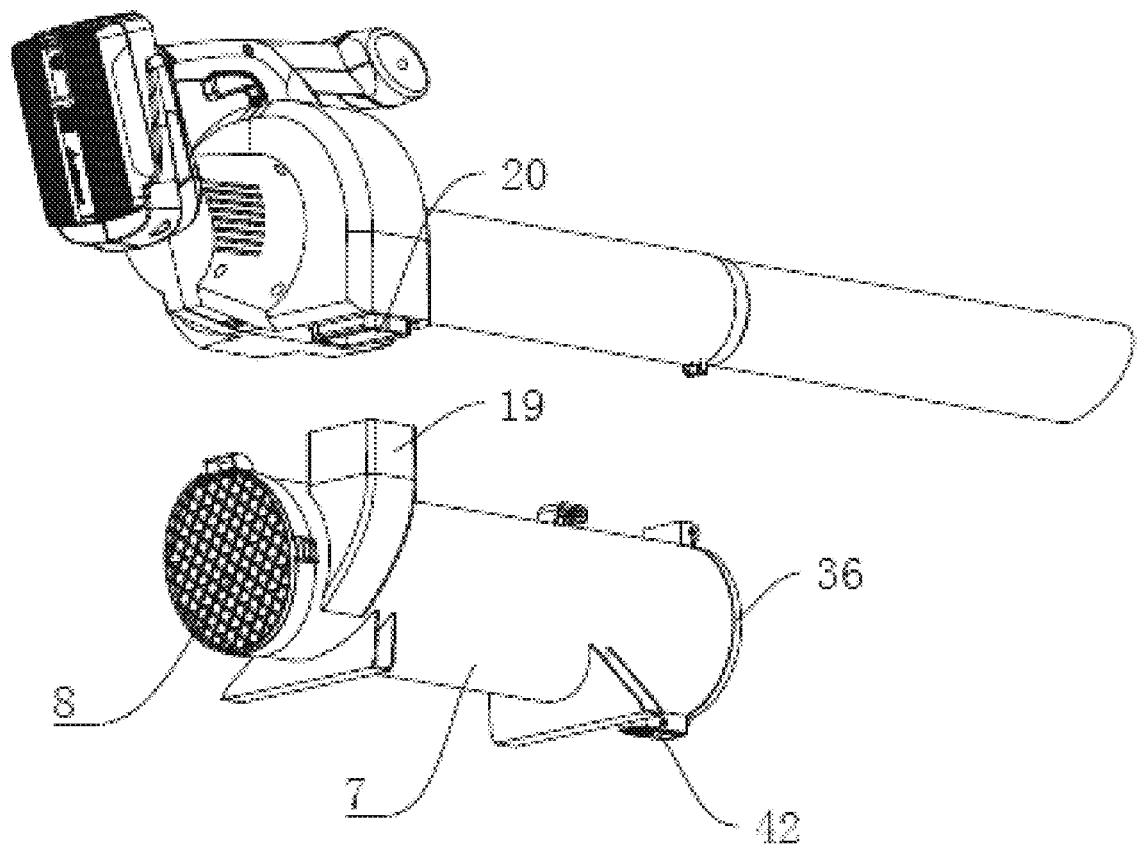
FIG. 7 is a schematic view of a collecting cartridge connected to a casing.

Referring to FIG. 5 and FIG. 7, a connecting duct 20 for circulating air is formed at the bottom ends of the first cartridge 12-1 and the second cartridge 12-2. A collecting duct 19 that is arranged at an upper part of the collecting cartridge 7 is fixed on the connecting duct 20. The collecting duct 19 arranged at the upper part of the barrel shaped collecting cartridge 7 extends in tangential direction. The collecting duct 19 can be directly fixed to the connecting duct 20 in a plug-in fashion with an interference fit, or can be fixed via bolts or the like. The collecting cartridge 7 can be removably connected to the connecting duct 20. The collecting cartridge 7 further includes a filtering unit 8 arranged at its rear end and a discharge cap 36 arranged at its front end. The fallen leaves are filtered by the filtering unit 8. Air is directly discharged out from the filtering unit 8, and the collected fallen leaves are directly taken out through the discharge cap 36.

Figure 8:
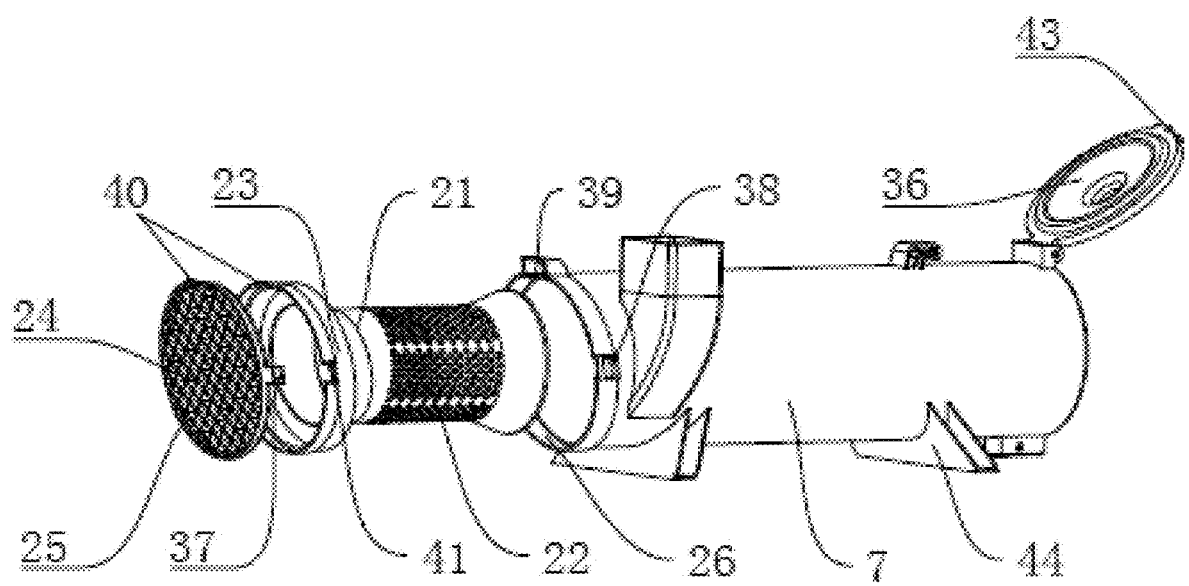
FIG. 8 is a schematic structural view of an interior of the collecting cartridge.

As shown in FIG. 8, the filtering unit 8 mainly includes an air inlet duct 21 in the collecting cartridge 7. The air inlet duct 21 is cylindrical and is provided with filtering holes 22 in its sidewall. In addition, a locating duct 23 is arranged at the rear end of the air inlet duct 21 and is used for being located on the collecting cartridge 7. The locating duct 23 is integrally formed with the air inlet duct 21. The air inlet duct 21is integrally formed with a frustoconical duct body at its front end. Air is guided by the inclined surface of the frustoconical duct body, such that the air is guided to rotate centrifugally. An annular groove 26 having a slightly larger diameter than that of the locating duct 23 is arranged at the rear end of the collecting cartridge 7. When the filtering unit 8 is mounted, the filtering unit 8 is fixed relative to the collecting cartridge 7 by locating the locating duct 23 in the annular groove 26. The filtering unit 8 further includes an air outlet screen 25. Air outlet holes 24 are distributed over the air outlet screen 25. The air outlet screen 25 is fixed in the locating duct 23 in a plug-in fashion. The interior of the locating duct 23 is counterbore shaped so as to embed the air outlet screen 25. Two elastic protrusions 37 are arranged on two sides of the air outlet screen 25 in diameter direction. Locating holes 38 are arranged in the wall of the annular groove 26 at the locations corresponding to those of the elastic protrusions 37. During the mounting, the locating duct 23 is located in the annular groove 26, and thus, the air outlet screen 25 is located on the sidewalls of the locating duct 23 and the annular groove 26, thereby obtaining that the air outlet screen 25, the locating duct 23 and the annular groove 26 are fixed relative to one other.

As shown in FIG. 8, a locating bump 39 is arranged on the top end of the annular groove 26. A slot 40 corresponding to the locating bump is arranged on each of the air outlet screen 25 and the locating duct 23, such that when the locating duct 23 and the air outlet screen 25 are plugged in the annular groove 26, the locating bump 39 is directly located in the slots 40, ensuring that the elastic protrusions 37 are located in the locating holes 38 at one time. Grooves 41 corresponding to the elastic protrusions 37 are arranged on the wall of the locating duct 23 to ensure that the elastic protrusions 37 of the air outlet screen 25 can be directly inserted in the locating holes 38 of the annular groove 26.

Referring to FIG. 8, the discharge cap 36 is arranged at the front end of the collecting cartridge 7. The top end of the discharge cap 36 is pivotably connected to the collecting cartridge 7 by a pin. An elastic holder 42 is arranged at the bottom end of the collecting cartridge 7. A bump 43 on the discharge cap 36 is held by the elastic holder 42 such that the discharge cap 36 can be open or closed relative to the collecting cartridge 7, thereby taking out the shredded and collected leaves from the collecting cartridge 7. Two rest parts 44 are arranged at the bottom end of the collecting cartridge 7. The whole blowing-suction machine can be stably placed on the ground via the rest parts44.

The process of shredding leaves is explained as below. The motor 3 is started to rotate the blades 4, such that the negative pressure created in the mounting cartridge 12 and the suction duct 2. Fallen leaves and the like are absorbed into the mounting cartridge 12 through the suction duct 2, and then are shredded into pieces by the cutter 10 cooperating with the secondary cutter 9 when passing through the cutting area. The shredded leaves enter into the collecting cartridge 7 through the blades 4 and the connecting duct 20. The shredded leaves are cyclonically separated from the air by centrifugal force, so that the shredded leaves are collected in the collecting cartridge 7and air is discharged out through the air inlet duct 21 and the air outlet screen 25. Finally, after a single operation, the discharge cap 36 is open to take out the shredded leaves.

The embodiments are merely explanatory and are not restrictive of the invention. After reading this specification, those skilled in the art can make various modifications to the embodiments as needed without creative work, which falls within the protection scope defined by the appended patent claims.

What is claimed is:

1. A blowing-suction machine, comprising a casing (1), a suction duct (2) arranged at a front portion of the casing (1), characterized in that
the blowing-suction machine further comprises a motor (3) and a shredder mechanism that are arranged in the casing (1) in order from rear to front,
a front end of the shredding mechanism is connected to a rear end of the suction duct (2),
the shredding mechanism comprises blades (4) and a cutting assembly (6) that are arranged in order from rear to front,
the blades (4) are arranged on an output shaft (5) of the motor (3), and
the cutting assembly (6) is arranged at a rear end of the suction duct (6) for shredding fallen leaves;
wherein the filtering unit (8) comprises:
an air inlet duct (21) that has an open end and a closed end, and is provided at its sidewall with filtering holes (22),
a locating duct (23) that is integrally formed with the air inlet duct (21) at the open end of the air inlet duct (21), and
an air outlet screen (25) that is provided with air outlet holes (24) and is accommodated in the locating duct (23).

2. The blowing-suction machine according to claim 1, wherein the blowing-suction machine further comprises a collecting cartridge (7) connected to a lower portion of the casing (1), and the collecting cartridge (7) accommodates a filtering unit (8) that is arranged at a rear end of the collecting cartridge (7) for separating fallen leaves from air.

3. The blowing-suction machine according to claim 2, wherein
the cutting assembly (6) comprises a secondary cutter (9) and a cutter (10) that are adjacently arranged in order from rear to front,
the cutter (10) is removably fixed at a front end of the output shaft (5),
the secondary cutter (9) is arranged between the blades (4) and the cutter (10), and
the cutter (10) is arranged at the front end of the casing (1) and forms a cutting area with the secondary cutter (9).

4. The blowing-suction machine according to claim 3, wherein
the shredding mechanism further comprises a mounting cartridge (12),
the blades (4) and the cutting assembly (6) are accommodated in the mounting cartridge (12) and are arranged in order from rear to front,
a front end of the mounting cartridge (12) is connected to the rear end of the suction duct (2),
the motor (3) is connected to the rear end of the mounting cartridge (12),
a mounting opening (13) is arranged at the front end of the mounting cartridge (12) and is communicate with the suction duct (2), and
the cutter (10) is arranged at the front end of the mounting cartridge (12).

5. The blowing-suction machine according to claim 4, wherein
the secondary cutter (9) further comprises an annular plate (14), a locating ring (15), and cutting arms (11) that are arranged between the annular plate (14) and the locating ring (15) in a diameter direction,
the locating ring (15) is removably fixed on the mounting cartridge (12) in a peripheral direction,
one end of each cutting arm (11) is arranged on the locating ring (15), and the other end of each cutting arm (11) is arranged on the annular plate (14), and
the cutter (10) cooperates with the cutting arms to form the cutting area.

6. The blowing-suction machine according to claim 5, wherein
the mounting cartridge (12) comprises a first cartridge (12-1) connected to the suction duct (2) and a second cartridge (12-2) for fixing the motor (3), the mounting opening (13) is arranged in the first cartridge (12-1),
the locating ring (15) is located in the mounting opening (13) in the peripheral direction,
the rear end of the suction duct (2) abuts against the locating ring (15), and
the suction duct (2) is fixed to the first cartridge (12-1) via connectors (16).

7. The blowing-suction machine according to claim 6, wherein
the casing (1) comprises a first housing (1-1) and a second housing (1-2) that are fixed to each other via bolts,
connecting posts (17) are respectively arranged on outer walls on both sides of the second cartridge (12-2),
connecting holes (18) are arranged on the first housing (1-1) and the second housing (1-2) for connecting the connecting posts (17).

8. The blowing-suction machine according to claim 6, wherein a collecting duct (19) is arranged on the collecting cartridge (7) for guiding air toward the filtering unit (8),
- the collecting duct (19) is communicated at its upper end with a connecting duct (20) arranged at a lower portion of the mounting cartridge (12), and
- the collecting cartridge (7) is cylindrical.

9. The blowing-suction machine according to claim 1, wherein an annular groove (26) is arranged at the rear end of the collecting cartridge (7), and the collecting duct (23) is plugged in the annular groove (26).

* * * * *